(12) United States Patent  
Schleiss et al.

(10) Patent No.: US 7,162,534 B2  
(45) Date of Patent: Jan. 9, 2007

(54) TRANSACTIONAL DATA COMMUNICATIONS FOR PROCESS CONTROL SYSTEMS

(75) Inventors: Trevor D. Schleiss, Austin, TX (US); Mark J. Nixon, Round Rock, TX (US); Neil J. Peterson, Austin, TX (US); Christopher Felts, Austin, TX (US); Grant Wilson, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 751 days.

(21) Appl. No.: 09/902,201

(22) Filed: Jul. 10, 2001

(65) Prior Publication Data

US 2003/0014500 A1 Jan. 16, 2003

(51) Int. Cl.
*G06F 15/16* (2006.01)

(52) U.S. Cl. .............. 709/232; 709/203; 709/224; 700/9; 700/78; 700/80

(58) Field of Classification Search ............. 709/223, 709/224, 238, 229, 203, 226, 232; 700/9, 700/78, 80
See application file for complete search history.

(56) References Cited

U.S. PATENT DOCUMENTS

| | | | |
|---|---|---|---|
| 4,527,271 A | 7/1985 | Hallee et al. | |
| 4,607,325 A | 8/1986 | Horn | |
| 4,657,179 A | 4/1987 | Aggers et al. | |
| 4,734,873 A | 3/1988 | Malloy et al. | |
| 4,763,243 A | 8/1988 | Barlow et al. | |
| 4,764,862 A | 8/1988 | Barlow et al. | |
| 4,885,694 A | 12/1989 | Pray et al. | |

(Continued)

FOREIGN PATENT DOCUMENTS

WO     WO 01/86476 A2     11/2001

OTHER PUBLICATIONS

Examination Report under Section 18(3) issued in GB 0215860.8 application by the United Kingdom Patent Office on Aug. 27, 2004.

(Continued)

*Primary Examiner*—David Wiley  
*Assistant Examiner*—Phuoc H. Nguyen  
(74) *Attorney, Agent, or Firm*—Marshall, Gerstein & Borun LLP

(57) ABSTRACT

A transactional data communications system and method communicates information within an enterprise having a process control system and a plurality of information technology systems that are communicatively coupled to the process control system via a web services interface and a transactional information server. The system and method generates transactional process control information and formats the transactional process control information based on an extensible markup language input schema to form formatted transactional process control information. The system and method sends the formatted transactional process control information to the transactional information server via the web services interface and maps the formatted transactional process control information to an extensible markup language output schema associated with one of the plurality of information technology systems to form mapped transactional process control information. The system and method then sends the mapped transactional process control information to the one of the plurality of information technology systems.

31 Claims, 5 Drawing Sheets

U.S. PATENT DOCUMENTS

| | | | |
|---|---|---|---|
| 4,907,167 A | 3/1990 | Skeirik | |
| 4,910,691 A | 3/1990 | Skeirik | |
| 4,944,035 A | 7/1990 | Aagardl et al. | |
| 4,956,793 A | 9/1990 | Bonne et al. | |
| 4,965,742 A | 10/1990 | Skeirik | |
| 5,006,992 A | 4/1991 | Skeirik | |
| 5,008,810 A | 4/1991 | Kessel et al. | |
| 5,015,934 A | 5/1991 | Holley et al. | |
| 5,018,215 A | 5/1991 | Nasr et al. | |
| 5,043,863 A | 8/1991 | Bristol et al. | |
| 5,050,095 A | 9/1991 | Samad | |
| 5,070,458 A | 12/1991 | Gilmore et al. | |
| 5,121,467 A | 6/1992 | Skeirik | |
| 5,134,574 A | 7/1992 | Beaverstock et al. | |
| 5,140,530 A | 8/1992 | Guha et al. | |
| 5,142,612 A | 8/1992 | Skeirik | |
| 5,161,013 A | 11/1992 | Rylander et al. | |
| 5,167,009 A | 11/1992 | Skeirik | |
| 5,187,674 A | 2/1993 | Bonne | |
| 5,193,143 A | 3/1993 | Kaemmerer et al. | |
| 5,197,114 A | 3/1993 | Skeirik | |
| 5,212,765 A | 5/1993 | Skeirik | |
| 5,224,203 A | 6/1993 | Skeirik | |
| 5,282,261 A | 1/1994 | Skeirik | |
| 5,291,190 A | 3/1994 | Scarola et al. | |
| 5,301,101 A | 4/1994 | MacArthur et al. | |
| 5,311,447 A | 5/1994 | Bonne | |
| 5,333,298 A | 7/1994 | Bland et al. | |
| 5,351,184 A | 9/1994 | Lu et al. | |
| 5,353,207 A | 10/1994 | Keeler et al. | |
| 5,369,599 A | 11/1994 | Sadjadi et al. | |
| 5,373,452 A | 12/1994 | Guha | |
| 5,384,698 A | 1/1995 | Jelinek | |
| 5,390,326 A | 2/1995 | Shah | |
| 5,396,415 A | 3/1995 | Konar et al. | |
| 5,398,303 A | 3/1995 | Tanaka | |
| 5,408,406 A | 4/1995 | Mathur et al. | |
| 5,442,544 A | 8/1995 | Jelinek | |
| 5,486,920 A | 1/1996 | Killpatrick et al. | |
| 5,486,996 A | 1/1996 | Samad et al. | |
| 5,488,697 A | 1/1996 | Kaemmerer et al. | |
| 5,537,310 A | 7/1996 | Tanake et al. | |
| 5,541,833 A | 7/1996 | Bristol et al. | |
| 5,546,301 A | 8/1996 | Agrawal et al. | |
| 5,559,690 A | 9/1996 | Keeler et al. | |
| 5,561,599 A | 10/1996 | Lu | |
| 5,566,065 A | 10/1996 | Hansen et al. | |
| 5,570,282 A | 10/1996 | Hansen et al. | |
| 5,572,420 A | 11/1996 | Lu | |
| 5,574,638 A | 11/1996 | Lu | |
| 5,596,704 A | 1/1997 | Geddes et al. | |
| 5,640,491 A | 6/1997 | Bhat et al. | |
| 5,666,297 A | 9/1997 | Britt et al. | |
| 5,687,090 A | 11/1997 | Chen et al. | |
| 5,692,158 A | 11/1997 | Degeneff et al. | |
| 5,704,011 A | 12/1997 | Hansen et al. | |
| 5,715,158 A | 2/1998 | Chen | |
| 5,729,661 A | 3/1998 | Keeler et al. | |
| 5,740,324 A | 4/1998 | Mathur et al. | |
| 5,742,513 A | 4/1998 | Bouhenguel et al. | |
| 5,761,518 A | 6/1998 | Boehling et al. | |
| 5,764,891 A | 6/1998 | Warrior | |
| 5,777,872 A | 7/1998 | He | |
| 5,781,432 A | 7/1998 | Keeler et al. | |
| 5,790,898 A | 8/1998 | Kishima et al. | |
| 5,796,609 A | 8/1998 | Tao et al. | |
| 5,798,939 A | 8/1998 | Ochoa et al. | |
| 5,805,442 A | 9/1998 | Crater et al. | |
| 5,809,490 A | 9/1998 | Guiver et al. | |
| 5,819,050 A | 10/1998 | Boehling et al. | |
| 5,819,232 A | 10/1998 | Shipman | |
| 5,825,645 A | 10/1998 | Konar et al. | |
| 5,826,249 A | 10/1998 | Skeirik | |
| 5,842,189 A | 11/1998 | Keeler et al. | |
| 5,847,952 A | 12/1998 | Samad | |
| 5,859,773 A | 1/1999 | Keeler et al. | |
| 5,859,964 A | 1/1999 | Wang et al. | |
| 5,877,954 A | 3/1999 | Klimasauskas et al. | |
| 5,892,679 A | 4/1999 | He | |
| 5,892,939 A | 4/1999 | Call et al. | |
| 5,898,869 A | 4/1999 | Anderson | |
| 5,901,058 A | 5/1999 | Steinman et al. | |
| 5,907,701 A | 5/1999 | Hanson | |
| 5,909,370 A | 6/1999 | Lynch | |
| 5,909,541 A | 6/1999 | Sampson et al. | |
| 5,909,586 A | 6/1999 | Anderson | |
| 5,917,840 A | 6/1999 | Cheney et al. | |
| 5,918,233 A | 6/1999 | La Chance et al. | |
| 5,924,086 A | 7/1999 | Mathur et al. | |
| 5,940,290 A | 8/1999 | Dixon | |
| 5,948,101 A | 9/1999 | David et al. | |
| 5,949,417 A | 9/1999 | Calder | |
| 5,960,441 A | 9/1999 | Bland et al. | |
| 5,975,737 A | 11/1999 | Crater et al. | |
| 5,984,502 A | 11/1999 | Calder | |
| 5,988,847 A | 11/1999 | McLaughlin et al. | |
| 6,008,985 A | 12/1999 | Lake et al. | |
| 6,017,143 A | 1/2000 | Eryurek et al. | |
| 6,033,257 A | 3/2000 | Lake et al. | |
| 6,041,263 A | 3/2000 | Boston et al. | |
| 6,047,221 A | 4/2000 | Piche et al. | |
| 6,055,483 A | 4/2000 | Lu | |
| 6,061,603 A | 5/2000 | Papadopoulos et al. | |
| 6,067,505 A | 5/2000 | Bonoyer et al. | |
| 6,076,124 A | 6/2000 | Korowitz et al. | |
| 6,078,843 A | 6/2000 | Shavit | |
| 6,093,211 A | 7/2000 | Hamielec et al. | |
| 6,106,785 A | 8/2000 | Havlena et al. | |
| 6,108,616 A | 8/2000 | Borchers et al. | |
| 6,110,214 A | 8/2000 | Klimasaukas | |
| 6,122,555 A | 9/2000 | Lu | |
| 6,128,279 A | 10/2000 | O'Neil et al. | |
| 6,266,726 B1 | 7/2001 | Nixon et al. | |
| 6,298,377 B1 | 10/2001 | Hartikainen et al. | |
| 6,298,454 B1 | 10/2001 | Schleiss et al. | |
| 6,317,701 B1 | 11/2001 | Pyötsiä et al. | |
| 6,332,110 B1 | 12/2001 | Wolfe | |
| 6,347,307 B1 * | 2/2002 | Sandhu et al. | 705/35 |
| 6,347,340 B1 * | 2/2002 | Coelho et al. | 709/246 |
| 6,363,421 B1 * | 3/2002 | Barker et al. | 709/223 |
| 6,446,110 B1 * | 9/2002 | Lection et al. | 709/203 |
| 6,571,201 B1 * | 5/2003 | Royal et al. | 702/188 |
| 6,591,260 B1 * | 7/2003 | Schwarzhoff et al. | 707/2 |
| 6,704,874 B1 * | 3/2004 | Porras et al. | 709/224 |
| 6,772,137 B1 * | 8/2004 | Hurwood et al. | 709/201 |
| 6,772,216 B1 * | 8/2004 | Ankireddipally et al. | 709/227 |
| 6,795,778 B1 * | 9/2004 | Dodge et al. | 702/34 |
| 6,826,597 B1 * | 11/2004 | Lonnroth et al. | 709/223 |
| 6,874,141 B1 * | 3/2005 | Swamy et al. | 717/144 |
| 2001/0047406 A1 * | 11/2001 | Araujo et al. | 709/223 |
| 2002/0049815 A1 * | 4/2002 | Dattatri | 709/206 |
| 2002/0059425 A1 * | 5/2002 | Belfiore et al. | 709/226 |
| 2002/0111876 A1 * | 8/2002 | Rudraraju et al. | 709/206 |
| 2003/0144746 A1 * | 7/2003 | Hsiung et al. | 700/28 |

OTHER PUBLICATIONS

Search Report under Section 17 issued in GB 0215860.8 application by the United Kingdom Patent Office on Feb. 3, 2003.

Examination Report under Section 18(3) issued in GB 0215860.8 application by the United Kingdom Patent Office on May 5, 2005.

Bono, J., "XML Reaches Factory Floor's Automation Islands," [On-line] Available: http://www.isa.org/Content/ContentGroups/

Industrial_Computing1/Insights/20002/XML_Reaches_Factory_Floors_Automation_Islands.htm (2000).

Hammer, "The Information Integration Wizard (IWiz) Project," University of Florida. [On-line]. Available: http:www.cise.ufl.edu/tech_reports/tr99/tr99-019.pdf (1999).

Sielinski, "Microsoft in Manufacturing," Microsoft Corp. Available: http://www.sme.org/gmn/mag/2000/00j10071/00j10071.html (2000).

Unkown, "Microsoft >NET for Manufacturing Enables Users to 'See.Use.Act' on Information Throughout Their Operations and With Customers and Suppliers," Microsoft Corp., [On-line] Available: http://www.microsoft.com/presspass/features/2000/aug00/08-22.netmanufact.asp (2000).

* cited by examiner

```
<deviceAlert3051>
<date>09/29/00</date>
<time>02:11:15 PM </time>
<tag>FT-100</tag>
<alert>MAINTENANCE</alert>
<description>Sensor Plugged</description>
<priority> 4 </priority>
<action> Remove and repair </action>
<state> act/unack </state>
</deviceAlert3051>
```
} XML

TRANSACTIONAL DATA COMMUNICATIONS FOR PROCESS CONTROL SYSTEMS

FIELD OF THE INVENTION

The present invention relates generally to process control systems and, more particularly, to the communication of transactional process control information within an enterprise.

DESCRIPTION OF THE RELATED ART

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals which are sent over the buses or other communication lines to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

Typically, a process control system operates within a business enterprise that may include several process control plants, component and/or service suppliers and customers, all of which may be distributed throughout a large geographic area, or in some cases, throughout the world. The process control plants, suppliers and customers may communicate with each other using a variety of communication media and technologies such as, for example, the Internet, satellite links, ground-based wireless transmissions, telephone lines, etc. Of course, the Internet has become a preferred communication platform for many business enterprises because the communications infrastructure is established, making the communication infrastructure costs for an enterprise near zero, and the technologies used to communicate information via the Internet are well-understood, stable, secure, etc.

Each process control plant within an enterprise may include one or more process control systems as well as a number of other business-related or information technology systems, which are needed to support or maintain or which are complementary to the operation of the process control systems. In general, the information technology systems within a process control plant may include manufacturing execution systems such as, for example, a maintenance management system and may also include enterprise resource planning systems such as, for example, scheduling, accounting and procurement systems. Although these information technology systems may be physically located within or near a plant, in some cases a few or possibly all of these systems may be remotely located with respect to the plant and may communicate with the plant using the Internet or any other suitable communication link. In any event, to improve or optimize the overall operation of an enterprise, some recent development efforts have been directed to facilitating more rapid and efficient communications and enabling more complete integration between process control systems and information technology systems within an enterprise.

Generally speaking, effective enterprise optimization requires integration of process control systems and information technology systems. Information technology systems typically include enterprise resource planning systems and manufacturing execution systems that are distributed throughout an enterprise. The complete integration of information technology systems and process control systems would enable, for example, an enterprise to recognize in response to a customer order for a product that additional parts for making the product are needed and automatically create and send orders to one or more suppliers for particular quantities of those component parts. Thus, the integration of information technology systems and process control systems would enable an enterprise to efficiently make more informed business and manufacturing decisions. Furthermore, such integration would enable business and manufacturing decisions to be made more accurately and quickly because, in many cases, the need for human intervention may be completely eliminated and many previously manual activities (i.e., activities executed by a human operator) such as ordering parts, for example, could be automated.

Unfortunately, the integration of process control systems and information technology systems is complicated by the fact that process control systems generate and use both real time data and transactional data. Real time data is typically communicated in a regular periodic or synchronous manner such as, for example, the communication of continuous pressure readings that may be provided by a pressure transmitter. Transactional data, on the other hand, is event driven and is typically generated infrequently in an asynchronous manner. One type of transactional data frequently used within a process control system is device generated alert or alarm information. For example, an alarm that results in a request to order maintenance and/or parts needed by the process control system to repair a problematic device is transactional in nature. Another type of transactional data results from production scheduling activities. For example, a production scheduling transaction to batch execute a recipe may include a date, a time, a material type and quantity, a material purity, a feedstock type and quantity, a catalyst type and quantity, etc. Still another type of transactional data may involve a computerized maintenance management system, which uses information such as, for example, a tag, a time, a date, an alert (e.g., failed, maintenance, advisory, etc.), a description, a priority, a recommended action (e.g,. replace the device), a device state (e.g., failure), etc.

One preferred flow of communications between the various process control and information technology systems that are typically found within an enterprise is defined by the ISA S95 model. In general, the ISA S95 model is an international standard that defines the interactions between production or process control systems, enterprise resource planning systems and manufacturing execution systems to facilitate the integration of these systems. More specifically, the ISA S95 model generally defines the interactions or communication flows between a process control system and order processing systems, accounting systems, product shipping administration systems, product inventory control systems, quality assurance systems, maintenance management systems, material procurement systems, material and energy control systems, production scheduling systems, etc. While the ISA S95 model generally defines communication flows between the systems within a plant or an enterprise, this standard does not define a specific mechanism by which these communication flows may be carried out.

Traditionally, to implement the communication flows between the systems of an enterprise as specified by the ISA S95 standard, a special communication software driver is developed to interface to every device or system within a process control plant. In other words, for each device or system within an enterprise, a specially developed communications software driver is typically required to enable that device or system to communicate with another device or system. As a result, when any system, device or component within the enterprise changes due to, for example, a firmware upgrade, replacement, etc., the driver for that system, device or component may also have to be changed. Obviously, the large number of custom drivers needed results in a lot of time consuming driver maintenance which, in turn, results in high enterprise maintenance costs. As a practical matter, system designers may selectively develop custom communications interfaces to enable communications between a relatively small subset of the systems, devices or components within an enterprise and, as a result, some pairs of systems, devices or components may not be able to exchange information.

Recent developments have enabled a more efficient exchange of real time process control information between the various systems, devices and components within a process control system or between process control systems. Object linking and embedding for process control (OPC) provides a mechanism that eliminates the need for individual custom communications software drivers that convey real time process control data between the systems, devices and components of a process control system. As is well known, OPC is based on Microsoft object linking and embedding (OLE) technology, which provides a common interface for the various systems, devices and components making up a process control system. Typically, each of the systems, devices and components of the process control system includes an OPC communication layer and, thus, speaks a common standardized language for purposes of conveying real time information. In this manner, the communication of real time data within the process control system can take place in an efficient manner, and changes to any of the systems, devices or components does not require any changes to a software driver.

While OPC has become an industry standard mechanism for communicating real time process control data within a process control system, or between process control systems, OPC currently only supports communications involving real time data. OPC does not enable, for example, a process control system to convey transactional data or information to an order processing system to initiate the ordering of a raw material, a replacement part, etc. because OPC does not support the transfer of data having more structure (i.e., more structure than real time process control data) such as data representing time information, material information, quantity information, etc. Furthermore, because OPC is based on Microsoft networking technology, which generates communications that do not transfer well via the Internet, it is very difficult, if not impossible, to use OPC to transfer information from a process control system over the Internet to, for example, a remotely located order processing facility, supplier facility, etc. The difficulty in using OPC to transfer information via the Internet is further compounded by the fact that it is very difficult to configure OPC-based communications through firewalls, which are in widespread use, particularly in the case of Internet-based communications between business entities.

Thus, the exchange of transactional information or data between the systems, components or devices of an enterprise cannot be practically carried out using OPC. For example, in the case of a transaction involving a computerized maintenance management system, OPC does not support the transfer of the types of information (e.g., tag, time, alert, etc.) that need to be conveyed to the maintenance management system to enable the maintenance management system to take appropriate corrective actions, display alert information to a user, etc. Additionally, even if such transactional information could be conveyed to the maintenance management system using OPC, OPC could not be used to convey the necessary information via the Internet to a supplier, for example, to order a replacement part being requested by the maintenance management system. To effectively communicate such transactional data with presently available systems, it would be to necessary to develop custom communication interfaces for each of the systems, devices, etc. that must be integrated to carry out each type of transactional data exchange.

SUMMARY OF THE INVENTION

The transactional data communications technique described herein facilitates the exchange of transactional information or data between the devices, systems and other entities making up a business enterprise. In accordance with one aspect of the invention, a system and method of communicating information within an enterprise having a process control system and a plurality of information technology systems may generate transactional process control information and may format the transactional process control information based on a first extensible markup language schema to form formatted transactional process control information. The system and method may also send the formatted transactional process control information to a transactional information server via a web services interface and may map the formatted transactional process control information to a second extensible markup language schema associated with one of the plurality of information technology systems to form mapped transactional process control information. Still further, the system and method may send the mapped transactional process control information to a first one of the plurality of information technology systems. Additionally, the system and method may use an XML input schema to form the formatted transactional process control information and may map the formatted transactional process control information to an XML output schema associated with an application that is executed within the one of the plurality of information technology systems.

In accordance with another aspect of the invention, a system for use in an enterprise having a plurality of information technology systems may include a process control system that is adapted to format transactional process control information based on an extensible markup language and a plurality of input schemas. Each of the plurality of input schemas may be associated with a type of transactional process control information. The system may further include a web services interface communicatively coupled to the process control system. The system may also include a transactional data server communicatively coupled to the web services interface and the plurality of information technology systems. The transactional data server may be adapted to map transactional process control information that has been formatted based on the extensible markup language and the plurality of input schemas to a plurality of output schemas. Each of the plurality of output schemas may be associated with an application that is executed within one of the plurality of information technology systems and the transactional data server may be further adapted to send mapped transactional process control information to one of the plurality of information technology systems.

In accordance with yet another aspect of the invention, a method of processing transactional process control data may include the steps of wrapping the transactional process control data in an XML wrapper to form XML wrapped transactional process control data and sending the XML wrapped transactional process control data via a web services interface and communication network to an XML data server. The method may map the XML wrapped transactional process control data to an XML output schema associated with one of a plurality of information systems that are communicatively coupled via the communication network to form mapped XML transactional process control data. Additionally, the method may include the step of sending the mapped XML transactional process control data to the one of the plurality of information systems via the communication network.

DESCRIPTION OF THE PREFERRED EMBODIMENTS

Figure 1:
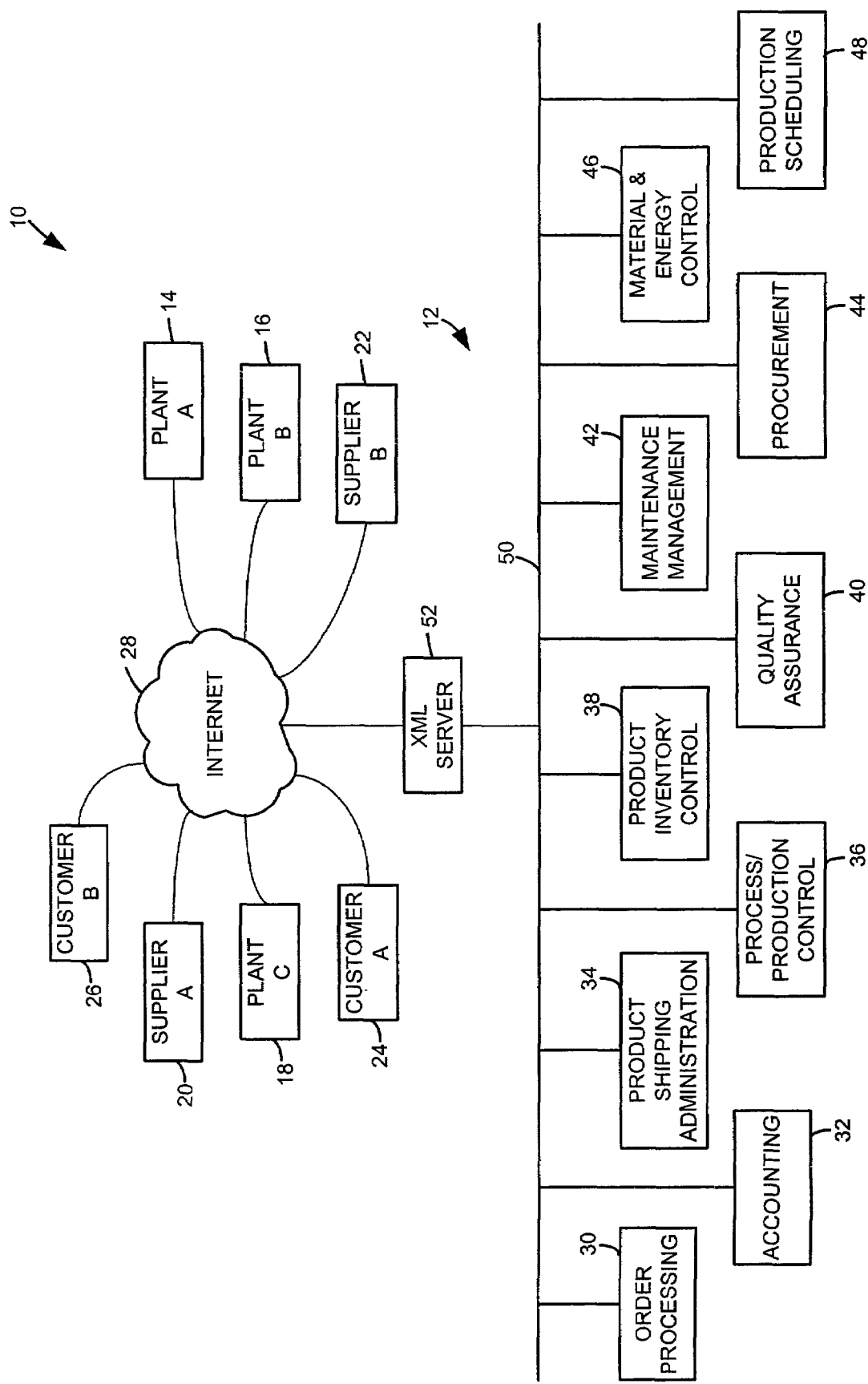
FIG. 1 is an exemplary schematic block diagram of an enterprise that enables a process control system to exchange transactional process control data with a plurality of information technology systems.

FIG. 1 is an exemplary schematic block diagram of a business enterprise 10 that includes a plurality of communicatively coupled components, systems, business entities, etc. By way of example only, the enterprise 10 shown in FIG. 1 includes a local process control plant 12, remote process control plants 14–18, component and/or material suppliers 20 and 22, and customers 24 and 26, all of which may be communicatively coupled to the Internet 28 as shown. While many of the systems, business entities, etc. shown within the enterprise 10 are coupled to the local process control plant 12 via the Internet 28, it should be recognized that any other suitable communication link may be used instead without departing from the scope and the spirit of the invention. Additionally, it should be recognized that devices, systems and entities other than those specifically illustrated in FIG. 1 may be communicatively coupled to the plant 12 via the Internet 28 or any other suitable communication link.

The local process control plant 12 may include a plurality of enterprise resource planning systems, manufacturing execution systems, process control systems, etc. In particular, the local process control plant 12 shown in FIG. 1 includes an order processing system 30, an accounting system 32, a product shipping and administration system 34, a production or process control system 36, a product inventory control system 38, a quality assurance system 40, a maintenance management system 42, a procurement system 44, a material and energy control system 46 and a production scheduling system 48, all of which may be communicatively coupled via a data bus or local area network (LAN) 50. The LAN 50 may be based on Ethernet or may use any other suitable communication link. Of course, while the resource planning systems, manufacturing execution systems, process control systems, etc. of the plant 12 are shown as being communicatively coupled via the LAN 50, one or more of these systems may alternatively or additionally be communicatively coupled to the Internet 28. In any event, as described in greater detail below, the systems 30–48 within the plant 12 may communicate via an XML server 52. As shown in FIG. 1, the XML server 52 is communicatively coupled to the Internet 28 so that, if desired, one of more of the systems 30–48 may exchange information with one or more of the plants 14–18, the suppliers 20 and 22, and the customers 24 and 26.

Because the XML server 52 enables the communication of information between any two systems, components, entities, etc. within the enterprise 10, it is possible for an action or condition within, for example, the process control system 36 to initiate or cause activities within any other system, component or entity of the enterprise 10. Likewise, the various systems or entities within the enterprise 10 may initiate or cause activities within the process control system 36. By way of example, and as discussed in greater detail below, device alert or alarm information generated by a device within the process control system 36 may be sent to the XML server 52 which, in turn, may send alarm information to the maintenance management system 42 so that plant operations and maintenance personnel may be notified of the alarm condition. Additionally, the XML server 52 may also send information to the order processing system 30 to, for example, order a replacement part that is needed to repair a faulty device that has caused the alarm condition. The order processing system 30 may then send appropriate information via the XML server 52 to the supplier 20 to automatically order the replacement part from the supplier.

Figure 2:
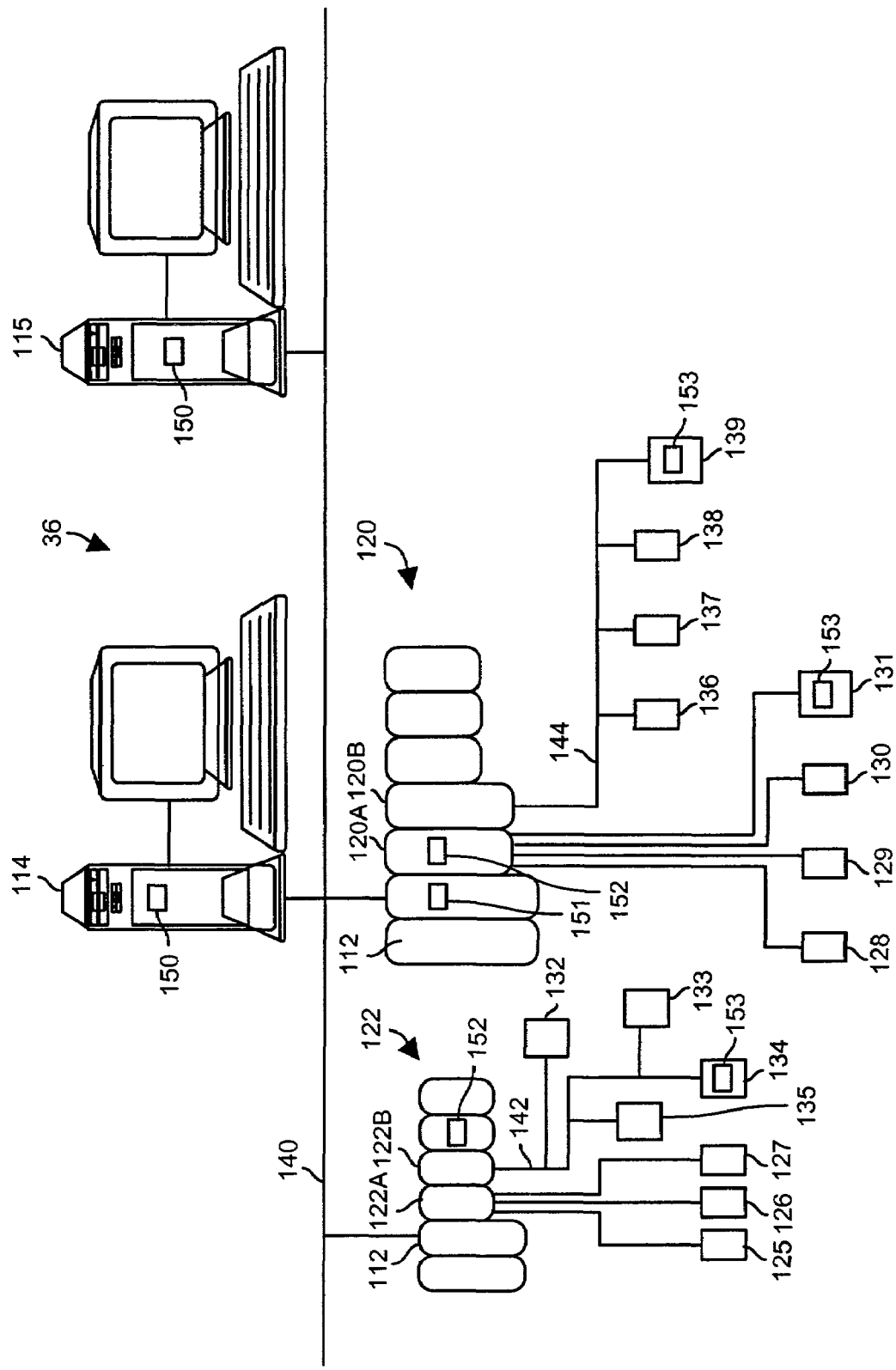
FIG. 2 is a more detailed exemplary schematic block diagram of the process control system shown in FIG. 1.

Referring now to FIG. 2, the process control system 36 includes one or more process controllers 112 connected to host workstations or computers 114 and 115 (which may be any type of personal computers or workstations) and banks of input/output (I/O) devices 120 and 122, each of which is connected to one or more field devices 125–139. The controllers 112 maybe, for example, DeltaV™ controllers sold by Fisher-Rosemount Systems, Inc., and are communicatively connected to the host computers 114 and 115 via, for example, an Ethernet connection 140 or any other suitable communication link. Likewise, the controllers 112 are communicatively connected to the field devices 125–139 using any desired hardware and software associated with, for example, standard 4–20 mA devices and/or any smart communication protocol such as the Fieldbus or HART protocols. One or more of the computer 114 and 115 may also function as a server that enables the process control system 36 to exchange data with other process control systems (not shown) and/or with the XML server 52 shown in FIG. 1.

As is generally known, the controllers 112 implement or supervise process control routines stored therein or otherwise associated therewith and communicate with the field devices 125–139 to control a process being executed by the process control system 36 in any desired manner. The field devices 125–139 may be any types of devices, such as sensors, valves, transmitters, positioners, etc., while the I/O cards within the banks 120 and 122 may be any types of I/O devices conforming to any desired communication or controller protocol such as HART, Fieldbus, Profibus, etc. In the exemplary process control system 36 shown in FIG. 2, the field devices 125–127 are standard 4–20 mA devices that communicate over analog lines to the I/O card 122A, the field devices 128–131 are HART devices connected to a HART compatible I/O device 120A, and the field devices 132–139 are smart devices, such as Fieldbus field devices, that communicate over a digital bus 142 or 144 to the I/O cards 120B or 122B using, for example, Fieldbus protocol communications. Of course, the field devices 125–139 and the banks of I/O cards 120 and 122 may conform to any other desired standards or protocols instead of the 4–20 mA, HART or Fieldbus protocols, including any standards or protocols developed in the future.

Each of the controllers 112 is configured to implement a control strategy using what are commonly referred to as function blocks. As is well known, each function block is a part (e.g., a subroutine) of an overall control routine and operates in conjunction with other function blocks (via communications called links) to implement process control loops within the process control system 36. Function blocks typically perform an input function, such as that associated with a sensor or other process parameter measurement device, a control function, such as that associated with a control routine that performs PID control, fuzzy logic control, etc., or an output function that controls the operation of some device, such as a valve, to perform some physical function within the process control system 36. Of course, hybrid and other types of function blocks exist. Function blocks may be stored in and executed by the controller 112, which is typically the case when function blocks are used for, or are associated with, standard 4–20 mA devices and some types of smart field devices, or may be stored in and implemented by the field devices themselves, which may be the case with Fieldbus devices.

Before discussing the manner in which the transactional data communications technique described herein enables the communication of process control information generated within the process control system 36 to be distributed throughout the enterprise 10, a general discussion of the manner in which alarm and event information is generated by the process control system 36 is provided below. In the process control system 36 shown in FIG. 2, the computer 114 functions as an operator workstation and has alarm or event processing software 150 stored therein. Generally speaking, the alarm or event processing software 150 displays information about the process control system 36 pertinent to the operator's understanding or ability to view the current operational status of the process with respect to the alarms present in the system 36. For example, the alarm or event processing software 150 may display an alarm banner having alarm indications therein and a primary control display illustrating a section of the process control system 36, including the devices and other equipment associated with that section of the process control system 36 relevant to one of the alarms or events. The primary control display may provide information about the current state of the process control system 36, such as the level of a fluid in a tank, the flow characteristic of a valve and other fluid lines, the settings of equipment, the readings of sensors, etc.

An operator may use the alarm or event processing software 150 to view different parts of the process control system 36 or equipment within the process control system 36. Of course, the alarm or event processing software 150 communicates with the controllers 112 and, if necessary, the field devices 125–139, any of the banks of I/O devices 120, 122 or any other devices to obtain the relevant values, settings and measurements associated with or being made in the process control system 36 to create the interface screen on the operator display of the computer or workstation 114.

The alarm or event processing software 150 may be configured to receive alarm messages created by alarm generating software within some or all of the controllers 112, the I/O devices 120 and 122 and/or the field devices 125–139. This software is illustrated as software elements 151, 152 and 153 in FIG. 2. Generally speaking, the alarm or event processing software 150 receives different categories of alarm or event messages including, for example, process alarms (which are typically generated by a process control software modules, such as those made up of communicatively interconnected function blocks, forming process control routines used during runtime of the process), hardware alarms, such as alarms generated by the controllers 112, I/O devices 120 and 122 or the workstations 114 and 115, pertaining to the state or functioning condition of these devices, and device alarms, which are generated by some or all of the field devices 125–139 to indicate problems associated with those devices. These or other categories of alarms or events may be generated in any desired manner. For example, it is well known to have the function blocks or software modules that are used to implement process control functions generate process alarms, and these process alarms are typically sent in the form of alarm messages to operator interfaces for display. Also, newer smart devices, controllers, I/O devices, databases, servers, workstations, etc. may use any desired proprietary or non-proprietary software to detect problems, errors, maintenance alerts, etc. and may send alarms or events indicating these conditions to the operator interface of the computer or workstation 114. In particular, many of the devices now available, such as controllers, I/O devices and smart field devices are provided with software and/or sensors that detect hardware problems, such as a stuck valve plug, broken parts, maintenance concerns, etc. and may generate signals or messages indicting these conditions.

Generally speaking, there are different categories of alarms or events that can be generated and displayed including, for example, process alarms, device alarms and hardware alarms. Process alarms generally indicate a problem with the functional operation of the process control software, i.e., a problem with the process control routine itself such as out of bound measurement, abnormal variances between process parameters and set points, etc. Process alarms are typically configured by the user as components of process control modules and may appear in the configuration information provided on the operator interface as being associated with a module name. Some types of process alarms include bad input/output, out of bound measurements, exceeded thresholds, etc. Because process alarms are well known in the art, they will not be described in more detail herein.

Device alarms are alarms associated with the operation of the field devices within the process and may be detected by software (e.g., the software 153 in FIG. 2) within the field devices or other devices connected within the process control system 36 to indicate a problem or error with the operation of a field device. Device alarms may appear in the operator interface of the system described herein as being associated with a particular device. Device alarms may, for example, indicate that the pressure in a valve is too great or too small for proper operation of the valve, that the motor current in the valve is to high or to low, that the voltage levels of a device are not synchronized, that a valve plug within a valve is stuck, that the device is not communicating properly, that the device needs scheduled maintenance because, for example, a certain amount of time has passed or because a valve member of the device has undergone a certain amount of travel since the last maintenance, etc. Device alarms can be generated in any desired manner, including with the use of proprietary or non-proprietary software located on a device itself or in other devices connected to the device for which the alarm is being generated to recognize and detect specific problems with the device and to generate an alarm with respect thereto. As indicated above, many smart devices are now being produced to create and communicate device alarms.

Of course, there can be many different types of device alarms including, for example, failure alarms indicating that a failed or failing condition exists within a device, maintenance alarms indicating that maintenance of some type should take place, communication alarms indicating that a device is not communicating properly or at all, advisory alarms, etc. A failure (e.g., a "failed") alarm indicates that a device has detected one or more conditions indicating that it cannot perform a critical function and, thus, requires attention immediately. On the other hand, a maintenance alarm indicates that a device is able to perform critical functions but has one or more detected conditions that may lead to a failure if left unaddressed and, thus, the device should receive maintenance attention soon. A communication (e.g., a "not communicating") alarm becomes active when a device stops communicating. An advisory alarm indicates that a device has detected conditions that do not fall into the other alarm categories. Usually, an advisory alarm is an alarm provided by individual devices particular to the type of device, such as a flow meter tracking the variability of the flow signal. In this case, the device may recognize that a variability in some signal associated with the device is too high or too low, which means that something unusual has happened and requires investigation. Depending on the device, advisory alarms may require more or less urgent attention than maintenance alarms and, thus, users may set the priority of the advisory alarm lower than that of the maintenance alarm. However, failed, maintenance and advisory alarms may not be supported by every device and a single, catch all alarm, such as an "abnormal" alarm for generic devices may be used instead of the failed, maintenance, and advisory alarms resulting in two total alarms, i.e., not communicating and abnormal. Of course, other types of device alarms could be created or used instead of or in addition to the ones discussed above.

As discussed above, device alarms or alerts may indicate that a device has failed, that a device needs maintenance or of an advisory nature. Additionally, more detailed information may be provided in connection with a device alert such as, for example, recommended actions may be provided to instruct the user, system operator, maintenance person, etc. on what to do to in response to a particular alarm condition. In the case of Foundation Fieldbus devices, device alerts or messages may include information fields such as: date, time, tag (i.e., a unique identifier for a particular device), alert (e.g., whether the device is failed, needs maintenance, or whether the alarm is of an advisory nature), description, priority level, recommended action, state (i.e., whether the alarm message has been acknowledged or if it remains unacknowledged).

In addition to processing alarms and events, the software 150 may generate and/or process equipment condition information and process condition information. Still further, one or more additional software programs may be executed within the computers 114 and 115 to perform a variety of well known advanced control and condition monitoring activities. For example, the computers 114 and 115 may include vibration monitoring software, real-time optimization software, expert system software, predictive maintenance software, loop monitoring software, or any other desired software that processes data obtained from a process control system.

Figures 3, 4:
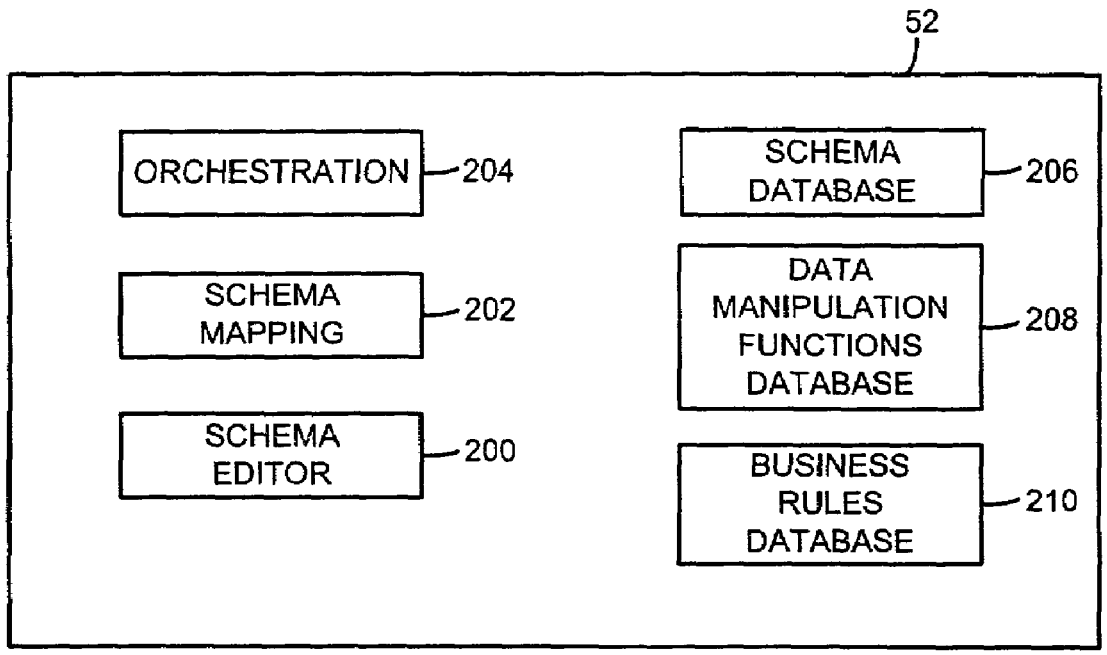
FIG. 3 is a more detailed functional block diagram of the XML server shown in FIG. 1.
FIG. 4 is an exemplary input schema for a device alert that may be used with the system shown in FIG. 1.

FIG. 3 illustrates a more detailed functional block diagram of the XML server 52 shown in FIG. 1. As noted above, the XML server 52 uses an extensible markup language, such as, for example, XML, to enable the communication of transactional information and, particularly, transactional process control data (e.g., alarm data or device alerts, process condition data, equipment condition data, etc.), throughout the enterprise 10. Although extensible markup languages such as XML are well known, a brief discussion of XML is provided below to facilitate understanding of the transactional data communications technique described herein.

Generally speaking, XML enables virtually any type of data or information (including transactional data) to be wrapped or encapsulated with a schema that defines and provides structure (i.e., format) to the information or data. As is well known, XML is a self-describing language in which the various elements of any given schema describe the encapsulated or wrapped data. As is also well known, XML developed from the same standard that resulted in the development of the now familiar hypertext markup language (HTML), which has become a standard means of conveying graphic display information via the Internet. Although XML encapsulated or wrapped data may be easily transmitted via the Internet, as can HTML formatted data, XML is fundamentally different from HTML because XML provides definition and structure to transmitted data (as opposed to merely formatting the display of transmitted data, which is the case with HTML). As a result, XML has become the primary mechanism by which different business entities exchange transactional information via the Internet.

By way of example, ordering consumer goods via a retailer's website typically involves an exchange of transactional data that has been encapsulated or wrapped in an XML schema. Likewise, a transaction at an automated teller machine involves the exchange of transactional data that may use an XML encapsulation or wrapper to convey the transactional data. In the case of the purchase of a product via an Internet website, the retailer or manufacturer website owner may receive order entry information (which is transactional data) from a customer and, in response, may check inventory and delivery time. If the retailer or manufacturer discovers that stock is out or is unacceptably low, additional units may be ordered. When an estimated shipment date is available, the retailer or manufacturer may send an email or any other form of electronic message to confirm for the customer when the ordered products will ship. Additionally, the retailer or manufacturer may enter a charge to a debit or charge card account number that was provided by the customer. In this manner, present systems that exchange information using XML schemas may be used to more efficiently pass transactional data or information via the Internet or using any other communication network or link. Importantly, present XML-based communication systems do not enable or facilitate the transmission of transactional process control data between the various components or systems of an enterprise. Nor do these conventional XML-based systems enable the transmission of transactional process control data from one business entity to another via a communication network such as, for example, the Internet.

The transactional data communications technique described herein enables transactional information, such as transactional process control data, to be exchanged between different components, devices and business entities of an enterprise. In particular, the transactional data communications technique described herein wraps or encapsulates transactional process control data such as, for example, alarm and event information, process condition information, equipment condition information, etc., using an XML schema that can be easily conveyed between different devices, components and systems within the enterprise, regardless of whether the communications use the Internet, a LAN or any other communication media and technology. Additionally, the transactional data communications technique described herein uses an XML transaction server to facilitate the communication of XML encapsulated or wrapped transactional process control data between the systems that make up an enterprise. In this manner, the process control systems within an enterprise may be more fully integrated with the information technology systems used by the enterprise.

More specifically, the XML server 52 may be implemented using any suitable XML transaction server. Exemplary commercially available XML transaction servers are provided by or sold under the trade names Vignette, Data Junction, Ariba, Click Commerce and Microsoft Biztalk Server 2000. While the following discussion describes the transactional data communications technique as being based primarily on the Microsoft Biztalk Server 2000, it should be understood that any other existing or later developed XML transaction server may be similarly adapted to carry out the transactional data communications technique described herein without departing from the scope and the spirit of the invention.

As shown in FIG. 3, the XML server 52 may include a variety of functional blocks and databases. In particular, the XML server 52 may include a schema editor 200, a schema mapping block 202, an orchestration block 204, a schema database 206, a data manipulation functions database 208 and a business rules database 210. The schema editor 200 enables a user to define input and output schemas for communicating transactional process control data generated within the process control system 36. An exemplary input schema for a device alert or alarm generated within the process control system 36 is shown in FIG. 4. As shown in FIG. 4, the information, attributes or elements typically contained within a device alarm such as, for example, a date, a time, a tag, an alert (e.g., failed, maintenance, advisory), a description, a priority, a recommended action, a state, etc. are wrapped or encapsulated within an XML format, including specific delimiters, characters, etc. that enable processing of the XML formatted device alert by the XML server 52. The schema editor 200 also enables a user to define a name for each attribute or element, define a format for the data associated with each element name and to define whether or not each element of the schema is needed for validation of the schema. While the above example illustrates a schema for a device alert, the schema editor 200 enables a user to define an input schema for any desired type of transactional data that may be sent to the XML server 52 by the process control system 36. As described in greater detail below, the process control system 36 must be configured to send transactional process control data to the XML server 52 using the appropriate schema format (i.e., using an appropriate XML input schema).

The schema editor 200 may also be used to create various output schemas, each of which may correspond to a particular application running within one of the systems 30–48, the plants 14–18, the suppliers 20 and 22, the customers 24 and 26, or any other component, system, entity, etc. within the enterprise 10 shown in FIG. 1. Generally speaking, an output schema defines the information that is needed by a particular application to carry out its processing activities. For example, an output schema associated with the order processing system 30 may define data such as a part number, a supplier name, a quantity, etc. Of course, each system, component, entity, etc. within the enterprise 10 may use multiple different schemas and, while some output schemas may be used by more than one system within the enterprise 10, this is not necessarily the case and, in fact, each system within the enterprise 10 may have a unique set of output schemas. In any event, the input and output schemas created using the schema editor 200 may be stored in the schema database 206 and may be accessed and reused as needed by the XML server 52.

Furthermore, it should be recognized that input and output schemas may be created or generated for any entity, system, component, etc. within the enterprise 10. Thus, both input and output schemas may be created to convey information or data to or from the process control system 36. Likewise, input and output schemas may be created for any other systems such as, for example, the manufacturing execution systems, enterprise resources planning systems, etc. within the enterprise 10 to convey information to or from these systems.

The schema mapping block 202 enables a user to map each input schema to one or more output schemas. For example, an input schema associated with a device alarm generated within the process control system 36 may be mapped to output schemas associated with the maintenance management system 42, the order processing system 30, the supplier 20, or any other component, system or entity within the enterprise 10. Likewise, one or more input schemas associated with the maintenance management system 42, the order processing system 30, the supplier 20, or any other component, system or entity within the enterprise 10 may be mapped to one or more output schemas associated with the process control system 36. In mapping input schemas to output schemas, one or more of the data elements or attributes of each input schema may be mapped to one or more data elements or attributes of an output schema. Because there may not be a one-to-one correspondence between the data elements of input schemas and output schemas, the data mapping performed using the mapping block 202 may involve intermediate data manipulations. These intermediate data manipulations enable one or more input schema data elements to be processed or combined using data manipulation functions such as, for example, string concatenations, mathematical operations, number generations, etc., all of which may be stored in the data manipulation functions database 208.

When mapping between input and output schemas, each required data element of an output schema must be mapped to at least one corresponding data element of an input schema. Of course, some or all of the data elements of a particular input schema may not be used during the mapping and not all of the data elements of an output schema (i.e., those data elements that are not required) may be mapped to data elements of an input schema. Furthermore, multiple data elements of an input schema may be combined or otherwise manipulated and mapped to a single data element of an output schema using the data manipulation functions as noted above.

Figure 5:
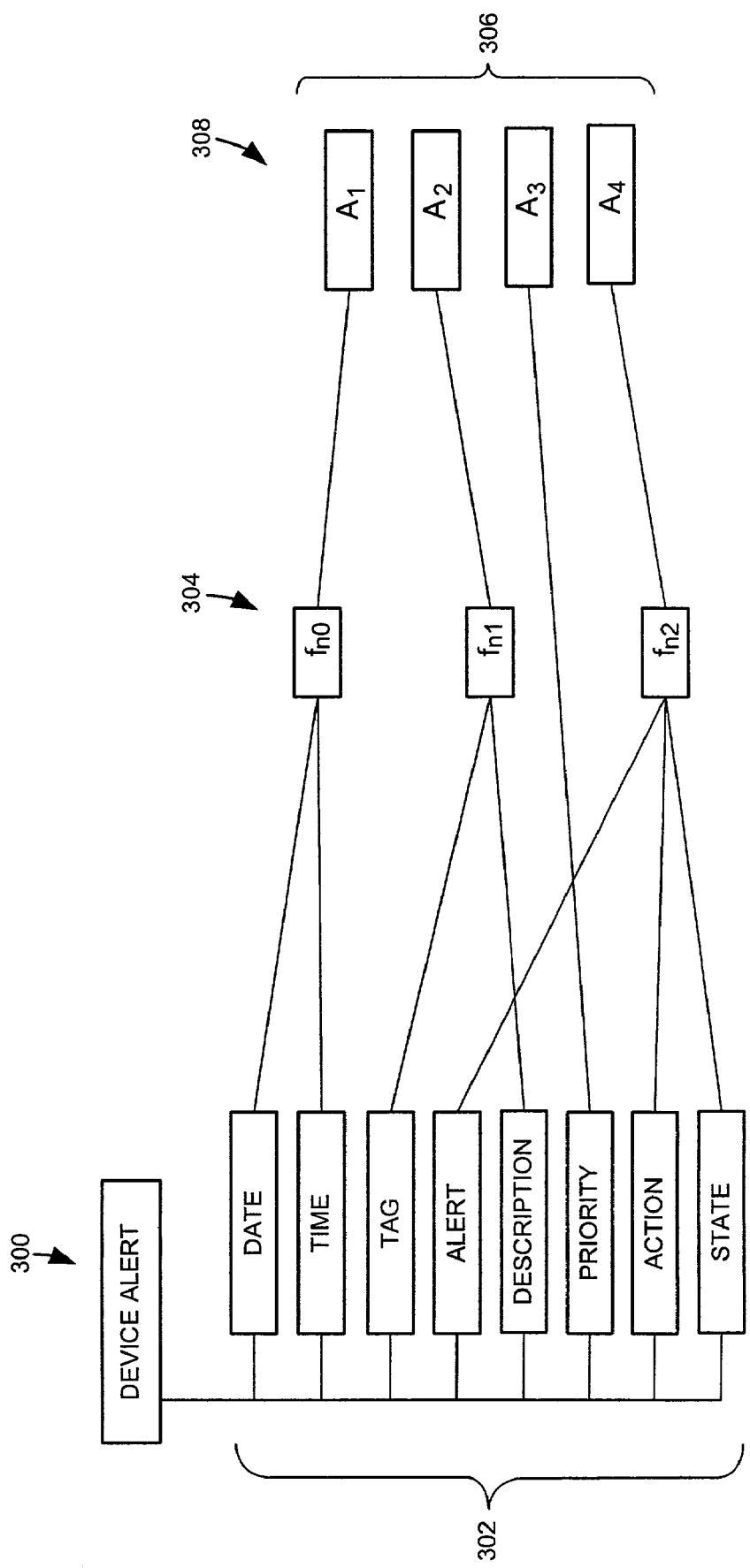
FIG. 5 is an exemplary diagrammatic view illustrating one manner in which an input schema may be mapped to an output schema.

FIG. 5 is an exemplary diagrammatic view that illustrates one manner in which the transactional data communications technique described herein may be used to map an input schema to an output schema. As shown in FIG. 5, an input schema 300, which is shown by way of example only to be the device alert schema of FIG. 4, includes a plurality of attributes or data elements 302. In this example, the input schema 300 is associated with the process control system 36. Alternatively, however, the input schema 300 could be associated with any other entity, system, component, etc. within the enterprise 10. One or more data manipulation functions 304 may be used to combine various ones of the attributes or data elements 302 to thereby map the ones of the attributes or data elements 302 to corresponding attributes or data elements 306 of an output schema 308. In the case where the input schema 300 which, in this case, is a device alert input schema, is associated with the process control system 36, the output schema 308 may be associated with the maintenance management system 42. In this manner, transactional data such as alarm data may be communicated from the process control system 36 to the maintenance management system 42.

Referring again to FIG. 3, the orchestration block 204 enables a user to implement one or more business rules, which may be stored within the business rules database 210, in response to events that occur within the enterprise 10. Typically, but not necessarily, the orchestration block 204 is used to facilitate the completion of several activities simultaneously in response to an event such as, for example, a device alarm, that occurs within the process control system 36. The business rules may store components, retrieve data from databases, tie actions to events, manage action tasks, etc. In any event, such business rules orchestration mechanisms are well known in the art and are not described further herein.

In operation, the results of mapping input schemas to output schemas and the orchestration of actions in response to events within the process control system 36 enables transactional process control data such as, for example, device alerts or events, process condition information and equipment condition information to be communicated anywhere within the enterprise 10. Additionally, the orchestration capabilities of the XML server 52 enable transactional process control data to be sent to multiple locations simultaneously. By way of example only, the orchestration block 204 may be used to route a device alert received from the process control system 36 to a pager worn by a service technician and, at the same time, may also be used to route the device alert to a user interface for display. The actions defined by an orchestration routine that responds to device alert schemas, for example, may vary based on the type of device alert received. For example, appropriate actions may be taken based on whether the device alert is a maintenance, advisory or failed alert. Of course, the device alert may also be mapped via input and output schemas as described above to cause the maintenance management system 42 to generate a work order in response to the device alert.

More specifically, the schema editor 200 may be used to map a device alert input schema to an output schema associated with an application being executed within the maintenance management system 42. As a result, when a device alert occurs within the process control system 36, the process control system 36 encapsulates or wraps the device alert in an appropriate XML schema (i.e., using a format specified by a device alert input schema stored within the XML server 52) and sends the XML device alert to the XML server 52 for processing. Upon receipt, the XML server 52 determines whether the XML device alert is valid (i.e., has all the required attributes or data elements) and then maps the XML device alert to an output schema associated with the maintenance management system 42 using mapping operations previously defined by the schema mapping block 202. The maintenance management system 42 then receives a mapped XML device alert, which may be displayed, printed or otherwise conveyed to system maintenance personnel or any other operator.

Additionally, when the XML server 52 receives the XML device alert, the orchestration block 204 may, based on the type of the device alert (i.e., whether the alert indicates "FAILED," "MAINTENANCE," or "ADVISORY"), initiate and execute various actions. For example, in the case where the device alert indicates that maintenance is needed, the orchestration block 204 may, based on business rules stored within the business rules database 210, automatically cause a page or other communication to be sent to a maintenance technician, may alert a system operator via a graphical and/or textual message displayed on an operator's terminal, may send the information to be displayed on a webpage, etc.

The transactional data communications technique described herein may also be used to facilitate the execution of a batch process campaign within the enterprise 10. In this case, a system operator uses the production scheduling system 48 to schedule or create a batch campaign. Once the batch campaign is created, the production scheduling system 48 wraps the campaign information (e.g., batch ID, recipe, number of batches required, etc.) in an appropriate XML schema and sends the XML campaign schedule information to the XML server 52. The XML server 52 then determines if the XML campaign information is a valid schema (i.e., whether it contains all the required data fields for an input schema) and, if the schema is valid, the XML server 52 maps the XML campaign schema to an appropriate output schema associated with the process control system 36. The XML server 52 then sends the campaign information to the process control system 36 wrapped in the campaign output schema. The process control system 36 may then extract the campaign information from this output schema and begin execution of the campaign.

Figure 6:
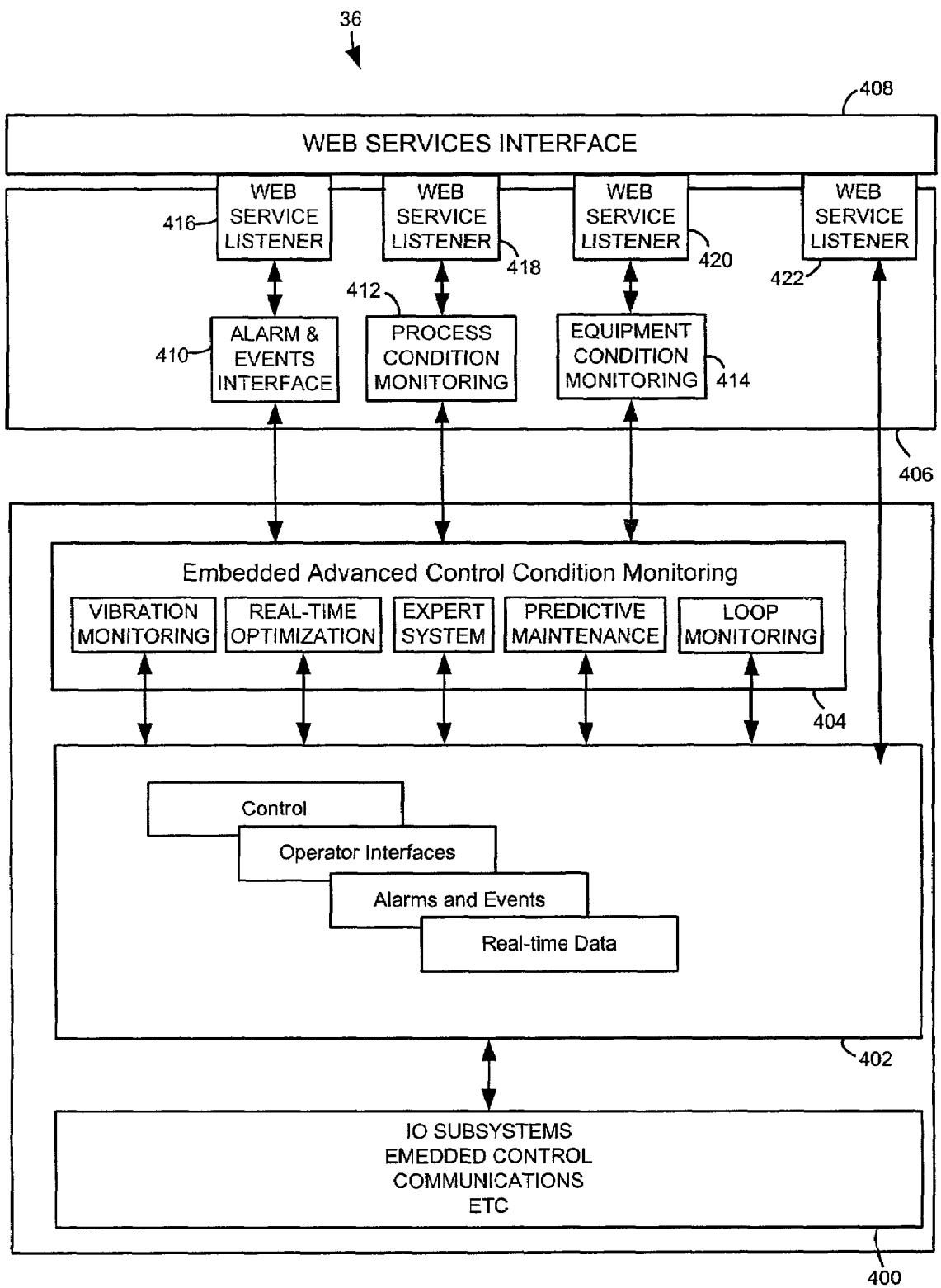
FIG. 6 is an exemplary diagrammatic view illustrating one manner in which the process control system shown in FIGS. 1 and 2 may be configured.

FIG. 6 is an exemplary diagrammatic view represents one manner in which the process control system 36 shown in FIGS. 1 and 2 may be configured to enable the communication of transactional information or data between the process control system 36 and any other entity, system, component, etc. of the enterprise 10. The system architecture shown in FIG. 6 includes an input/output (I/O) subsystems block 400, a process control subsystems block 402, an embedded advanced control and conditioning monitoring block 404, a web services block 406 and a web services interface 408. The I/O subsystems block 400 includes the controllers 112, the banks of I/O devices 120 and 122 and the field devices connected thereto. Whereas, the process control subsystems block 402 is preferably, but not necessarily, implemented using one or more software routines such as, for example the routines 150, that may be executed within one or more of the workstations 114 and 115. By way of example, the process control subsystems block 402 may include routines that carry out control functions, operator interface functions, alarms and events processing functions, real-time data processing functions, or any other desired functions. The embedded advanced control and condition monitoring block 404 may be implemented using a plurality of routines that process data and other information associated with the operation, condition, etc. of the process control system 36. For example, the embedded advanced control and condition monitoring block 404 may include vibration monitoring routines, real-time optimization routines, expert system routines, predictive maintenance routines, loop monitoring routines, or any other desired data analysis or data processing routines. One or more of the routines being executed by the embedded advanced control and condition monitoring block 404 may be performed within the same computer system or workstation that is being used to execute routines associated with the process control system subsystems block 402 or, alternatively, one or more of the routines associated with the embedded advanced control and condition monitoring block 404 may be performed within any other workstation or computer system that is communicatively coupled to the process control subsystems block 402.

The web services block 406 may include an alarms and events interface block 410, a process condition monitoring block 412 and an equipment condition monitoring block 414, all of which may be communicatively coupled to respective web service listeners 416, 418 and 420. Additionally, the web services block 406 may also include a web service listener block 422 that is communicatively coupled directly to the process control subsystems block 402 as shown in FIG. 6. Generally speaking, the web services block 406 enables information or physical data associated with alarms or events, process conditions and equipment conditions within the process control system 36 to be conveyed to and from a plurality of information technology systems. More specifically, the web services block 406 provides a portion of a web services framework or architecture that facilitates intra-system communications because conventional and commonly used transport protocols, such as, for example, hypertext transport protocol (HTTP) and data formal protocols, such as, for example, XML and SOAP, may be used convey process control information between the systems of an enterprise. As described in more detail below, the web service listeners 416–422 receive incoming messages that contain requests for service, parse these incoming messages and dispatch the requests for service to appropriate methods available within the web services block 406. Preferably, but not necessarily, the web service listeners 416–422 receive service requests and also provide service responses. Still further, the listeners 416–422 may provide contracts and other documents associated with the web service or services in communicating with that listener. Additionally, the web service listeners 416–422 preferably, but do not necessarily, convey alarm and event data, process condition data and equipment condition data using an XML format.

The web services interface 408 manages communications between the various web services within the web services block 406 and the systems, entities, components, etc. within the enterprise 10, one or more of which may communicate with the process control system 36 via the web services interface block 408 as a web client. In general, the web services interface block 408 provides a hosting or web server environment (i.e., a common interface) that enables a plurality of relatively technically diverse information technology systems such as, for example, manufacturing execution systems, enterprise resource planning systems, etc., or any other system associated with a remotely situated process control plant, customer, supplier, etc., to send and receive process control information or data to the process control subsystems block 402 and the advanced embedded control and condition monitoring block 404 of the process control system 36. In particular, the web services interface 408 is adapted to listen for incoming HTTP requests, perform security checks involving user authentication/verification, look up connection information and dispatch authorized HTTP requests to (establish a connection with) an appropriate one of the web services available within the web services block 406, facilitate automatic recovery from service, hosting environment and system failures, provide administrative facilities for deploying, monitoring and controlling services and managing resources such as, for example, processes, threads and shared state on behalf of each service.

As noted above, the transactional data communications technique described herein may be used to convey equipment condition data or information, process condition data or information and alarm, alert or any other event data or information between the process control system 36 and one or more of the information technology systems, suppliers, customers, remote plants, etc. within the enterprise 10. By way of example, the maintenance management system 42 (FIG. 1) may communicate with the process control system 36 via the XML server 52 using XML formatted data that is encapsulated within an HTTP packet. In this manner, the maintenance management system 42 may register interest in receiving (i.e., request) device alert information from the process control system 36. In response to such HTTP-based requests, the web services interface 408 may authenticate the maintenance management system 42 as a proper client of the web services block 406. Client authentication may be based on an identity of a user at the maintenance management system 42, the identity of the maintenance management system 42 itself, a terminal location within the maintenance management system 42 or any other suitable identification technique. If the maintenance management system 42 is authenticated as a proper client, the web services interface 408 establishes a connection with an appropriate web service within the web services block 406. In this case, because the maintenance management system 42 may register interest in device alert information, the web services interface 408 may establish a connection with a web service associated with the web service listener 416 and the alarms and events interface block 410. Once such a connection is established, any type of process control information accessible by the web service may be communicated between the requesting client and the process control system using HTTP packets containing XML formatted data.

When a device within the process control system 36 generates a device alert or alarm such as, for example, a maintenance alert, the process control system 36 sends this maintenance alert to the web services block 406 via the alarms and events interface 410. In turn, the web service associated with the web service listener 416 and the alarms and events interface 410 converts the received maintenance alert into an XML format and then sends the XML formatted alert information or data to the maintenance management system 42 via the XML server 52. Of course, as described above, appropriate input and output schemas need to be in place to properly convey the device alert information from the process control system 36 to the maintenance management system 42 and/or to perform any needed data mapping functions or manipulations. Once the maintenance management system 42 receives the mapped and/or manipulated alert data or information, the maintenance management system 42 may take appropriate actions such as, for example, generating a work order, ordering a replacement part, sending a page to a maintenance technician, etc. In a similar manner, any other system within the enterprise 10 may (if authenticated) become a client of one or more of the web services provided by the web services block 406 and may communicate alarm and event information, process condition information and equipment condition information to and from the process control system 36 via the web services interface block 408.

It should be recognized that the web services framework or architecture provided by the web services interface 408 and the web services block 406 enables any authenticated client within the enterprise 10 to exchange information or data with the process control system 36 using XML-based communications encapsulated within HTTP packets. Thus, any client that can execute an internet browser application can communicate with the process control system 36 via the web services interface 408 and the web services block 406. For example, a remote terminal or a hand held computer device adapted to execute a browser application may communicate with the process control system 36 via the Internet 28 or any other conventional or suitable communication link. Alternatively, such remote terminals, hand held devices, etc. may instead be adapted to invoke the execution of a browser within the web services interface block 408. In any event, because the web services interface block 408 and the web services block 406 communicate using well known web-based protocols and data formats, establishing communication links between the process control system 36 and the other entities, systems, components, etc. of the enterprise 10 does not require development of multiple custom communications interfaces, as is the case with conventional systems.

While the transactional data communications technique has been described as being implemented using an XML-based server, it can be implemented using any other suitable transactional data language on any suitable hardware platform. Although the transactional data communications technique is described herein as preferably being implemented as software, it may be implemented in hardware, firmware, etc. Thus, the transactional data communications technique described herein may be implemented in a standard multi-purpose processor or using specifically designed hardware or firmware as desired. When implemented in software, the software routines may be stored in any computer readable memory such as on a magnetic disk, a laser disk, or other storage medium, in a RAM or ROM of a computer or processor, etc. Likewise, the software may be delivered to a user or a process control system via any known or desired delivery method including, for example, on a computer readable disk or other transportable computer storage mechanism or over a communication channel such as a telephone line, the Internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of communicating information within an enterprise having a process control system and a plurality of information technology systems, the method comprising the steps of:
    generating transactional process control information related to a transactional event within the process control system, wherein the transactional process control information comprises at least one of the group consisting of device alarm information, process condition information and equipment condition information;
    formatting the transactional process control information based on a first extensible markup language schema to form formatted transactional process control information;
    sending the formatted transactional process control information to a transactional information server via a web services interface;
    mapping the formatted transactional process control information to a second extensible markup language schema associated with one of the plurality of information technology systems to form mapped transactional process control information; and
    sending the mapped transactional process control information to a first one of the plurality of information technology systems to use the mapped transactional process control information to perform a function related to the transactional event.

2. The method of claim 1, wherein the step of formatting the transactional process control information based on the first extensible markup language schema to form the formatted transactional process control information includes the step of using an XML input schema to form the formatted transactional process control information.

3. The method of claim 1, wherein the step of sending the formatted transactional process control information to the transactional information server via a web services interface further includes the step of sending the formatted transactional process control information via one of a local area network, a wireless communication link and an internet.

4. The method of claim 1, wherein the step of mapping the formatted transactional process control information to the second extensible markup language schema associated with the one of the plurality of information technology systems to form the mapped transactional process control information includes the step of mapping the formatted transactional process control information to an XML output schema associated with an application that is executed within the first one of the plurality of information technology systems.

5. The method of claim 1, wherein the step of mapping the formatted transactional process control information to the second extensible markup language schema associated with the first one of the plurality of information technology systems to form the mapped transactional process control information includes the step of using a data manipulation function to map a first attribute associated with the first extensible markup language schema to a second attribute associated with the second extensible markup language schema, wherein the first and second attributes are different.

6. The method of claim 1, wherein the step of sending the mapped transactional process control information to the first one of the plurality of information technology systems includes the step of sending the mapped transactional process control information via one of a local area network, a wireless communication link and an internet.

7. The method of claim 1, further comprising the step of determining within the transactional information server whether the formatted transactional process control information is associated with a valid input schema.

8. The method of claim 1, further comprising the step of using a business rule to send the mapped transactional process control information to a second one of the plurality of information technology systems.

9. A system for use in an enterprise having a plurality of information technology systems, the system comprising:
a process control system that is adapted to format transactional process control information based on an extensible markup language and a plurality of input schemas, wherein each of the plurality of input schemas is associated with a type of transactional process control information related to a transactional event within the process control system and wherein the transactional process control information comprises at least one of the group consisting of device alarm information, process condition information and equipment condition information;
a web services interface communicatively coupled to the process control system; and
a transactional data server communicatively coupled to the web services interface and the plurality of information technology systems, wherein the transactional data server is adapted to map transactional process control information that has been formatted based on the extensible markup language and the plurality of input schemas to a plurality of output schemas, wherein each of the plurality of output schemas is associated with an application that is executed within one of the plurality of information technology systems, and wherein the transactional data server is further adapted to send mapped transactional process control information to one of the plurality of information technology systems to use the mapped transactional process control information to perform a function related to the transactional event.

10. The system of claim 9, wherein the process control system is adapted to format the transactional process control information using XML.

11. The system of claim 9, wherein the plurality of input schemas includes an input schema associated with one of a device alert, an equipment condition and a process condition.

12. The system of claim 9, wherein the plurality of information technology systems are communicatively coupled via a communication network including one of a local area network and an internet.

13. The system of claim 9, wherein the transactional data server is further adapted to use a data manipulation function to map a first attribute of a particular input schema to a second attribute of a particular output schema, wherein the first and second attributes are different.

14. The system of claim 9, wherein the transactional data server is further adapted to use a business rule to send the mapped transactional process control information to the one of the plurality of information technology systems.

15. The system of claim 9, wherein the transactional data server is further adapted to determine whether transactional process control information is associated with a valid input schema.

16. A method of processing transactional process control data, comprising the steps of:
wrapping the transactional process control data in an XML wrapper to form XML wrapped transactional process control data related to a transactional event within the process control system, wherein the transaction process control data comprises information associated with at least one of the group consisting of a device alert, an equipment condition and a process condition;
sending the XML wrapped transactional process control data via a web services interface and a communication network to an XML data server;
mapping the XML wrapped transactional process control data to an XML output schema associated with one of a plurality of information systems that are communicatively coupled to the communication network to form mapped XML transactional process control data; and
sending the mapped XML transactional process control data to the one of the plurality of information systems via the communication network to use the mapped transactional process control data to perform a function related to the transactional event.

17. The method of claim 16, wherein the step of mapping the wrapped XML transactional process control data to the XML output schema associated with the one of the plurality of information systems to form mapped XML transactional process control data includes the step of using a data manipulation function to map a first attribute associated with an XML input schema to a second attribute associated with the XML output schema, wherein the first and second attributes are different.

18. The method of claim 16, wherein the step of sending the mapped XML transactional process control data to the one of the plurality of information systems via the communication network includes the step of sending the mapped XML transactional process control data to the one of the plurality of information systems via one of an internet and a local area network.

19. The method of claim 16, wherein the step of sending the mapped XML transactional process control data to the one of the plurality of information systems via the communication network includes the step of sending the mapped XML transactional process control data to one of an order processing system, an accounting system, a product shipping and administration system, a product inventory control system, a quality assurance system, a maintenance management system, a procurement system, a material energy and control system, a production scheduling system, a supplier's system, a customer's system and a process control plant.

20. A method of processing transactional process control data, comprising the steps of:
encapsulating the transactional process control data in a markup language wrapper to form encapsulated transactional process control data related to a transactional event within the process control system, wherein the transactional process control information comprises at least one of the group consisting of device alarm information, process condition information and equipment condition information;
sending the encapsulated transactional process control data via a web services interface and a communication network to a markup language data server;
mapping the encapsulated transactional process control data to an output schema associated with one of an enterprise resource planning system and a manufacturing execution system to form mapped transactional process control data; and
sending the mapped transactional process control data to the one of the enterprise resource planning system and the manufacturing execution system to use the mapped transactional process control data to perform a function related to the transactional event.

21. The method of claim 20, wherein the step of encapsulating the transactional process control data in the markup language wrapper to form the encapsulated transactional process control data includes the step of using XML to encapsulate the transactional process control data.

22. The method of claim 20, wherein the step of sending the encapsulated transactional process control data via the web services interface and the communication network to the markup language data server includes the step of sending the encapsulated process control data via one of a local area network and an internet.

23. The method of claim 20, wherein the step of mapping the encapsulated transactional process control data to the output schema associated with the one of the enterprise resource planning system and the manufacturing execution system to form the mapped transactional process control data includes the step of using a data manipulation function that maps a first attribute associated with the encapsulated transactional process control data to a second attribute associated with the output schema, wherein the first and second attributes are different.

24. The method of claim 20, wherein the step of sending the mapped transactional process control data to the one of the enterprise resource planning system and the manufacturing execution system includes the step of sending the mapped transactional process control data via one of a local area network and an internet.

25. A method of communicating transactional process control information within an enterprise, comprising the steps of:
   formatting the transactional process control information based on a first extensible markup language schema to form formatted transactional process control information related to a transactional event, wherein the transactional process control information comprises at least one of the group consisting of device alarm information, process condition information and equipment condition information;
   sending the formatted transactional process control information to a transactional information server;
   mapping the formatted transactional process control information to a second extensible markup schema associated with a process control system to form mapped transactional process control information; and
   sending the mapped transactional process control information to the process control system via a web services interface to use the mapped transactional process control information to perform a function related to the transactional event.

26. The method of claim 25, wherein the step of formatting the transactional process control information based on the first extensible markup language schema to form the formatted transactional information includes the step of using an XML input schema to format the transactional process control information.

27. The method of claim 25, wherein the step of mapping the formatted transactional process control information to the second extensible markup schema associated with the process control system to form the mapped transactional process control information includes the step of mapping the formatted transactional process control information to an XML output schema.

28. The method of claim 25, wherein the step of sending the mapped transactional process control information to the process control system via a web services interface further includes the step of sending the mapped transactional process control information to the process control system via one of a local area network and an internet.

29. A method of processing a device alarm for use within an enterprise including a process control system and a maintenance management system, comprising the steps of:
   generating a device alarm related to a transactional event within the process control system;
   formatting the device alarm based on an XML input schema to form an XML device alarm;
   sending the XML device alarm to an XML transaction server;
   mapping the XML device alarm to an XML output schema associated with the maintenance management system to form a mapped XML device alarm; and
   sending the mapped XML device alarm to the maintenance management system to use the mapped XML device alarm to perform a function related to the device alarm.

30. A method of processing equipment condition information for use within an enterprise including a process control system and an information technology system, comprising the steps of:
   generating equipment condition information related to a transactional event within the process control system;
   formatting the equipment condition information based on an XML input schema to form an XML message;
   sending the XML message to an XML transaction server;
   mapping the XML message to an XML output schema associated with the information technology system to form a mapped XML message; and
   sending the mapped XML message to the information technology system to use the mapped XML message to perform a function related to the message.

31. A method of processing process condition information for use within an enterprise including a process control system and an information technology system, comprising the steps of:
   generating process condition information related to a transactional event within the process control system;
   formatting the process condition information based on an XML input schema to form an XML message;
   sending the XML message to an XML transaction server;
   mapping the XML message to an XML output schema associated with the information technology system to form a mapped XML message; and
   sending the mapped XML message to the information technology system to use the mapped XML message to perform a function related to the message.

* * * * *

UNITED STATES PATENT AND TRADEMARK OFFICE
CERTIFICATE OF CORRECTION

PATENT NO. : 7,162,534 B2 Page 1 of 1
APPLICATION NO. : 09/902201
DATED : January 9, 2007
INVENTOR(S) : Duncan Schleiss et al.

It is certified that error appears in the above-identified patent and that said Letters Patent is hereby corrected as shown below:

In the Specification:

Column 6, line 52, "maybe" should be -- may be --.

Column 9, line 5, "to high or to low" should be -- too high or too low --.

Column 15, line 43, "used convey" should be -- use to convey --.

Signed and Sealed this

Twenty-fifth Day of December, 2007

JON W. DUDAS
*Director of the United States Patent and Trademark Office*